US009677329B2

(12) United States Patent
Knowles

(10) Patent No.: US 9,677,329 B2
(45) Date of Patent: Jun. 13, 2017

(54) EMERGENCY OVERRIDE RELEASE MECHANISM FOR MOTORIZED WINDOW SHADE ASSEMBLY

(71) Applicant: AEROSPACE TECHNOLOGIES GROUP, INC., Boca Raton, FL (US)

(72) Inventor: Byron R. Knowles, W. Palm Beach, FL (US)

(73) Assignee: Aerospace Technologies Group, Inc., Boca Raton, FL (US)

( * ) Notice: Subject to any disclaimer, the term of this patent is extended or adjusted under 35 U.S.C. 154(b) by 0 days.

(21) Appl. No.: 14/436,011

(22) PCT Filed: Oct. 15, 2013

(86) PCT No.: PCT/US2013/065018
§ 371 (c)(1),
(2) Date: Apr. 15, 2015

(87) PCT Pub. No.: WO2014/062662
PCT Pub. Date: Apr. 24, 2014

(65) Prior Publication Data
US 2015/0267465 A1    Sep. 24, 2015

Related U.S. Application Data

(60) Provisional application No. 61/714,098, filed on Oct. 15, 2012.

(51) Int. Cl.
*E06B 9/74* (2006.01)
*E06B 9/322* (2006.01)
(Continued)

(52) U.S. Cl.
CPC ............. *E06B 9/322* (2013.01); *B64C 1/1484* (2013.01); *E05F 15/603* (2015.01); *E06B 9/24* (2013.01);
(Continued)

(58) Field of Classification Search
CPC .......................... E06B 2009/2441; E06B 9/74
(Continued)

(56) References Cited

U.S. PATENT DOCUMENTS 3,561,520 A     2/1971  Gill
6,186,211 B1 *  2/2001  Knowles ................ B60J 1/2011
                                                160/84.02
(Continued)

FOREIGN PATENT DOCUMENTS

CN       102108832      6/2011
DE        20203221      5/2002
WO    WO 2012/097211    7/2012

OTHER PUBLICATIONS

Office Action dated Oct. 9, 2016 which issued in the corresponding Chinese Patent Application No. 201380059120.2.

Primary Examiner — David Purol
(74) Attorney, Agent, or Firm — Cozen O'Connor

(57) ABSTRACT

A manually operated override release mechanism for use with a motorized window shade assembly having a shade fabric with a leading edge, the shade fabric being disposed behind a pane and movable between an opened position and a closed position upon operation of a motor. The override release mechanism has an actuator movable between a first position and a second position and biased in the first position. The actuator has a first side secured to one end of a cable, and a second side. The other end of the cable is connected to the motor.

15 Claims, 21 Drawing Sheets

(51) Int. Cl.
  *E06B 9/262* (2006.01)
  *E06B 9/58* (2006.01)
  *B64C 1/14* (2006.01)
  *E05F 15/603* (2015.01)
  *E06B 9/24* (2006.01)
  *E06B 9/386* (2006.01)
  *E06B 9/68* (2006.01)
  *E06B 9/326* (2006.01)

(52) U.S. Cl.
  CPC ............ *E06B 9/262* (2013.01); *E06B 9/386* (2013.01); *E06B 9/58* (2013.01); *E06B 9/68* (2013.01); *E06B 9/74* (2013.01); *E06B 2009/2482* (2013.01); *E06B 2009/2627* (2013.01); *E06B 2009/3265* (2013.01); *E06B 2009/583* (2013.01); *E06B 2009/6809* (2013.01)

(58) Field of Classification Search
  USPC .......................................... 160/84.02; 74/625
  See application file for complete search history.

(56) References Cited

U.S. PATENT DOCUMENTS

| | | | |
|---|---|---|---|
| 6,230,784 B1 | 5/2001 | Sanz et al. | |
| 7,690,414 B2 * | 4/2010 | Knowles | B60J 1/2025 160/168.1 P |
| 2001/0011580 A1 * | 8/2001 | Knowles | B60J 1/2011 160/84.02 |
| 2010/0126676 A1 | 5/2010 | Tischer | |
| 2011/0108208 A1 * | 5/2011 | Knowles | E06B 9/327 160/123 |

* cited by examiner

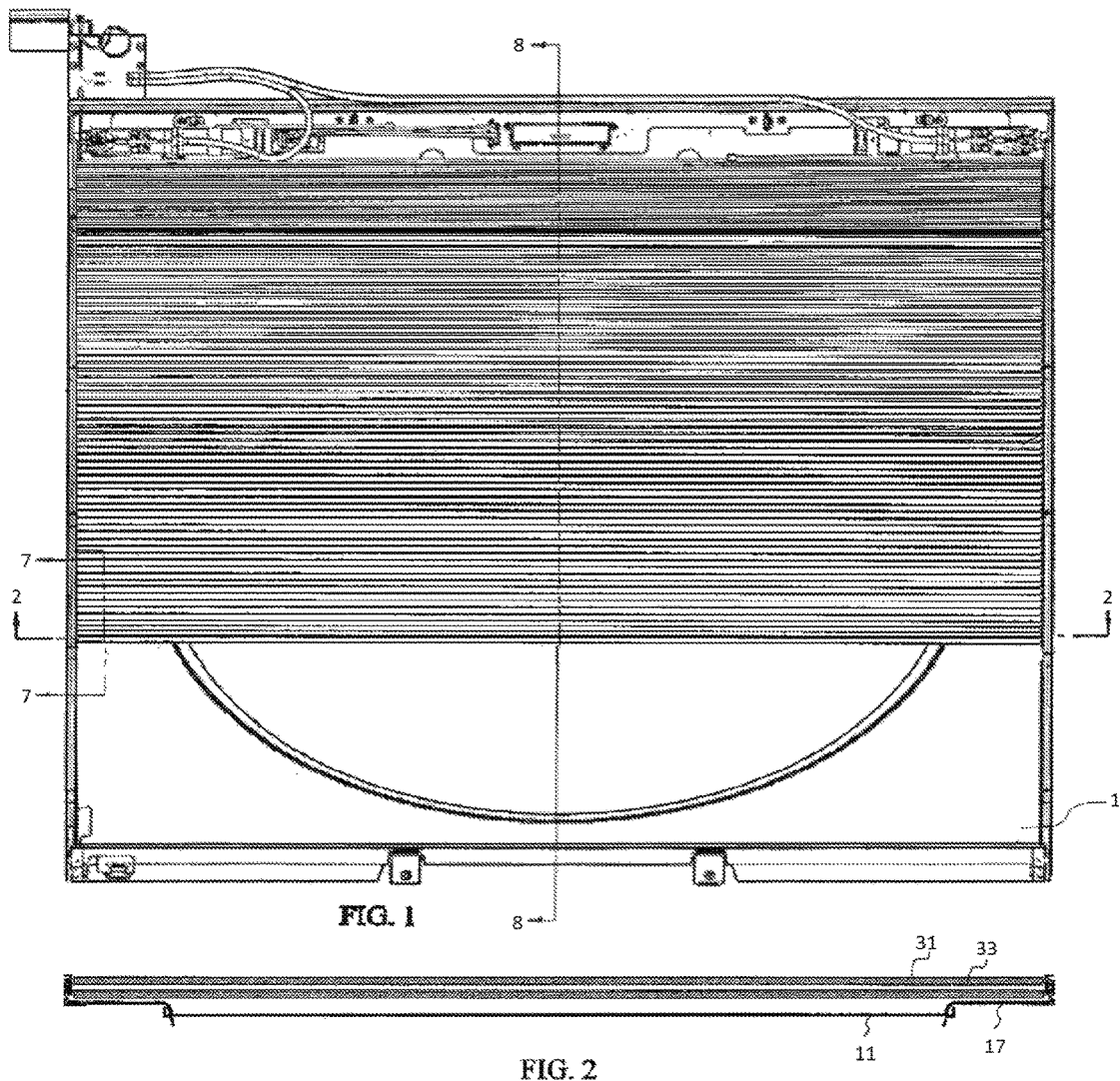

EMERGENCY OVERRIDE RELEASE MECHANISM FOR MOTORIZED WINDOW SHADE ASSEMBLY

CROSS REFERENCE TO RELATED APPLICATIONS

This is a U.S. national stage of application No. PCT/US2013/065018, filed on Oct. 15, 2013. Priority is claimed on U.S. Application No. 61/714,098, filed Oct. 15, 2012, the content of which is incorporated herein by reference.

BACKGROUND OF THE INVENTION

1. Field of the Invention

The present invention is directed to manually operated window shade assemblies adapted in particular for use in windows of airplanes, that are readily assembled and installed, and which provide convenient and reliable operation. More particularly, the present invention is directed to a manual override mechanism for a motorized window shade actuator wherein manipulation of the override mechanism causes release of a motor and allows manual movement of a window shade to an open position.

2. Description of the Related Art

The motorized window shade assembly disclosed in U.S. Pat. No. 6,186,211 was a major improvement over other mechanisms known at that time and is highly effective in reducing the number of components required, increasing reliability, and meeting the rigid requirements associated with the use aboard aircraft. The shade assembly disclosed in the aforementioned patent includes a pane behind which the shade material, i.e. the shade fabric, is mounted such that direct user contact with the shade material is prevented. As such, the window shade assembly utilizes actuators controlled by electric motors which receive operating power from an aircraft power bus, as is known in the art, to raise and lower the shade fabric. Further improvements of window shade mechanisms are disclosed in U.S. Patent Application Publication No. 2011-0108208 (Ser. No. 12/943,569) filed on Nov. 10, 2010, the content of which is incorporated by reference.

It is desired and in many instances required that the shade fabric of motorized airplane window shades of the type disclosed in U.S. Pat. No. 6,186,211 be moveable to its open position in certain circumstances, such as during plane landing, or in the event of an emergency. During plane landing, when operating power continues to be supplied to shade actuators, such as motors, shades can be raised in their normal operating manner by selecting the "up" or "open" button. During an emergency condition, however, shade operating power may cease, thereby rendering motorized shades—where access to the shade fabric does not exist—inoperable. In such an emergency condition, the shade fabric will be unable to be moved to its open position Accordingly, a need exists for a passenger-accessible manual actuator which allows a passenger to raise a shade fabric of a motorized shade assembly to an open position in the event of loss of operating power to the shade assembly.

SUMMARY OF THE INVENTION

One object of the present invention is to provide an emergency override mechanism for a motorized window shade assembly for raising a shade fabric in the event window shade operating power is lost, wherein the shade fabric is mounted behind a pane and, thus, otherwise inaccessible to a passenger.

Another object of the present invention is to provide a manually operated emergency override mechanism for a motorized window shade assembly having a passenger-accessible pull cord, for raising a window shade.

A further object of the present invention is to provide a passenger-usable emergency override mechanism for a motorized window shade, wherein activation of the emergency override mechanism decouples the shade fabric from operating motors and allows the shade fabric to be manually raised by the passenger through continued manipulation of the override mechanism.

A still further object of the present invention is to provide a passenger-usable emergency override mechanism for a motorized window shade assembly wherein release of the emergency override mechanism after use causes recoupling of operating motors to maintain the shade fabric in its then-raised position and to allow for the resumption of motorized shade operation when operating power is restored to the motorized shade assembly.

These and other objects are attained in accordance with one aspect of the present invention directed to an emergency override mechanism for raising a fully closed, or partially closed, shade fabric of a motorized shade assembly. The emergency override mechanism provides a passenger-accessible pull cord positioned proximate the window shade assembly, with the pull cord having a first end, engageable with a leading edge of the shade fabric, namely the edge proximate a bottom edge of a cutout or hole in which the shade assembly is mounted, and a second end which is capable of being grasped by a passenger. The emergency override mechanism is arranged such that when tension is applied to the pull cord, one or more motors which under normal operating conditions raise, lower and maintain the shade fabric in its then-horizontal position, are decoupled from the shade assembly to allow the raising of the shade fabric through continued pulling of the pull cord. Releasing the pull cord causes a re-coupling of the motors to maintain the raised shade fabric in its position and to allow continued motor operation once power is restored to the shade assembly.

A manually operated override release mechanism is disclosed for use with a motorized widow shade assembly having a shade fabric with a leading edge, the shade fabric being disposed behind a pane and movable between an opened position and a closed position upon operation of a motor. The override release mechanism has an actuator movable between a first position and a second position and biased in the first position. The actuator has a first side secured to one end of a cable, and a second side. The other end of the cable is connected to the motor. The actuator causes the motor to decouple from the motorized window shade assembly when tension is applied to the cable by the actuator. The motor is in an operating position when the actuator is in the first position and is in a decoupled position when the actuator is in the second position. A tether is attached at one end to the shade fabric proximate the leading edge. The tether is slidably engaged with the actuator and has a free end accessible by a user. When tension is applied to the free end of the tether, such as by a user pulling the tether, the force from the act of pulling urges the actuator to the second position and causes decoupling of the motor from the motorized window shade assembly to allow for manual operation of the shade fabric through pulling of the tether. When the pulling force ceases, such as when the tether is released, the motor recouples to the motorized window shade assembly to allow for motorized operation of the shade fabric.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

FIG. 1 is an elevational view of a window assembly which includes a motorized window shade mechanism in accordance with an embodiment of the invention.

FIG. 2 is a cross section taken along line 2-2 of the window assembly of FIG. 1.

DETAILED DESCRIPTION OF THE PRESENTLY PREFERRED EMBODIMENTS

Figure 3:
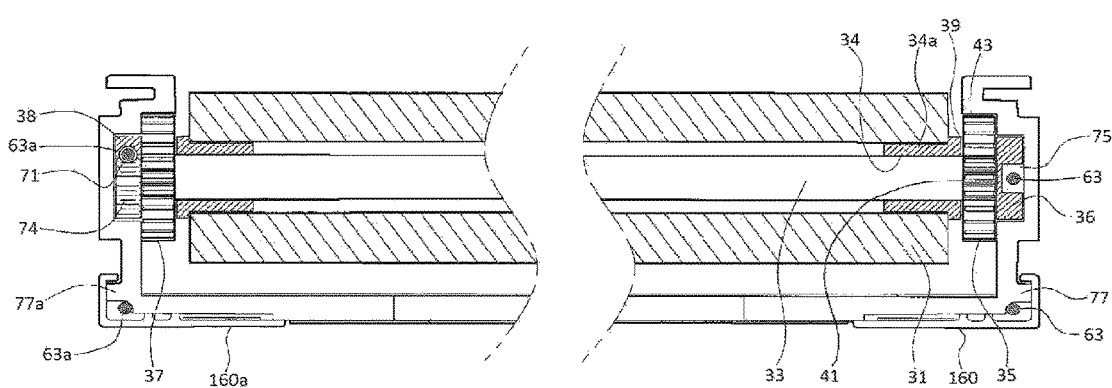
FIG. 3 is an enlargement of the ends of the cross section shown in FIG. 2.

As shown in FIG. 1, window assembly 1 ("window" hereinafter) has a cutout 3 and window shades 5 and 7 which are positioned so that they can be deployed to block passage of at least some light through cutout 3. Each of window shades 5 and 7 is made of any known type of pleated material conventionally used for shades which can be compressed relatively tightly, to a height of less than one-half inch, for example, so that it occupies a minimal amount of space at the top of the window in order to provide an unimpeded view and to allow light to pass completely unobstructed through cutout 3. Shade 5 is made of a translucent material that lets some light through. Shade 7 is made of an opaque material that lets little or no light through. Each shade can be extended to any desired position. From the fully compressed position of both shades at the top of the window, shade 5 is first movable to any desired position, such as the partially extended position shown in FIG. 1. Shade 7 remains fully compressed as shade 5 is extended. When shade 5 is fully extended, shade 7 can be moved to any desired position. In this way, the passenger has practically an infinite choice of how much light to admit through the window.

Figure 4:
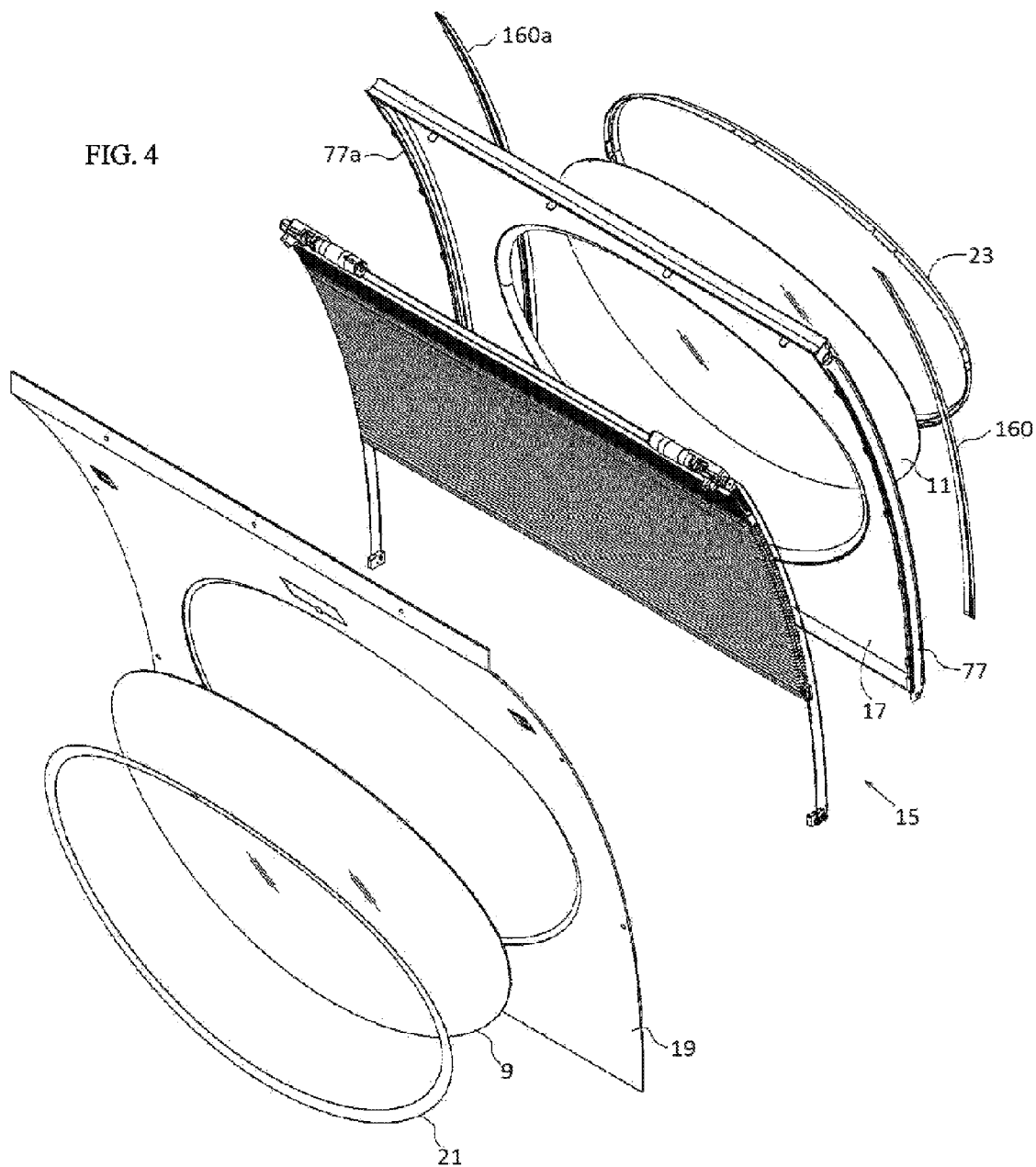
FIG. 4 is an exploded view of an aircraft window into which has been incorporated the embodiment of the invention as shown in FIG. 1 but with an emergency override mechanism removed for simplicity.
Figure 9:
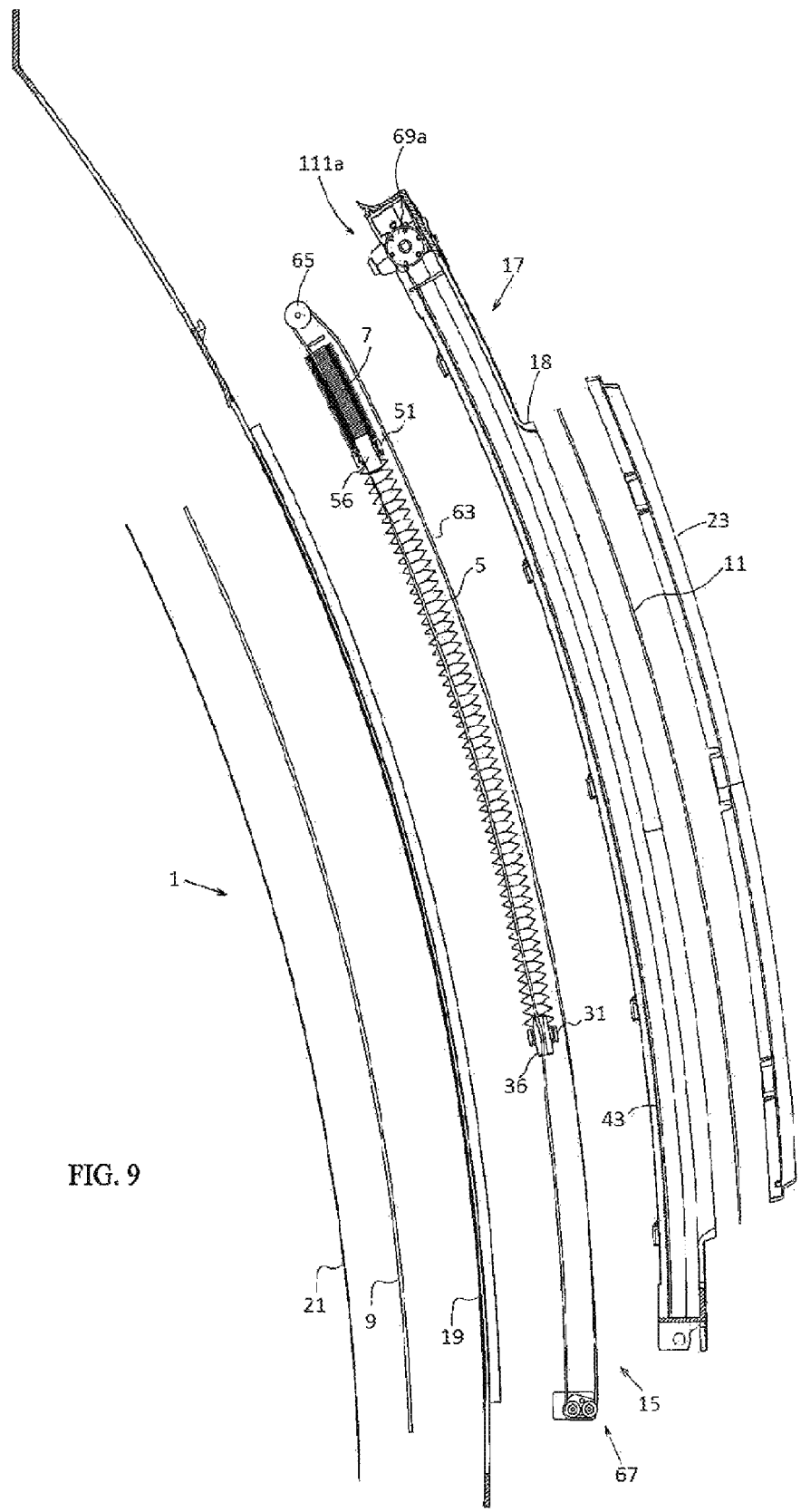
FIG. 9 is an exploded view corresponding to the window assembly as shown in FIG. 8, except that motorized drive mechanism 15 is not shown in section but rather in a side view.

Although window 1 can be any type of window set in any environment, the present invention is disclosed with particular applicability to an aircraft window. As shown in FIGS. 4 and 9, an aircraft window is typically contoured to fit the curvature of the particular aircraft body into which it will be installed. Window 1 has an inner pane 9 and an outer pane 11. A motorized drive mechanism 15 (see FIGS. 4, 5 and 9) is provided for operating window shades 5 and 7. Mechanism 15 is placed in shell 17 and is kept in place by a panel 19 which is attached to the shell. Inner pane 9 is secured by retainer 21 which is snap-fit into a slot (not shown) in panel 19. Outer pane 11 is secured by retainer 23 which is snap-fit onto a flange of shell 17. Thus, shades 5 and 7 are positioned within the interior space of the window between panes 9 and 11.

Figure 8:
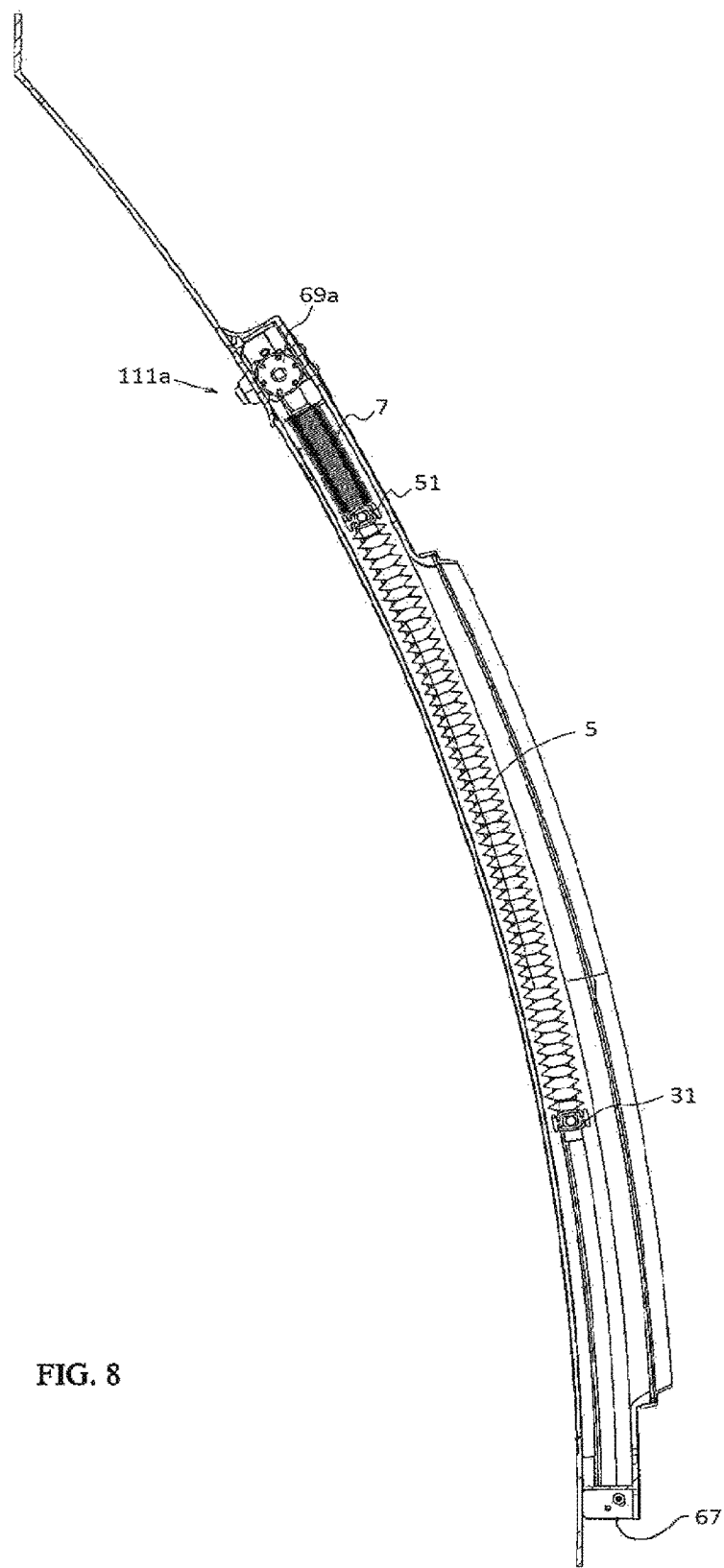
FIG. 8 is a cross section taken along line 8-8 of the window assembly of FIG. 1, shown with the emergency override mechanism removed.
Figure 10:
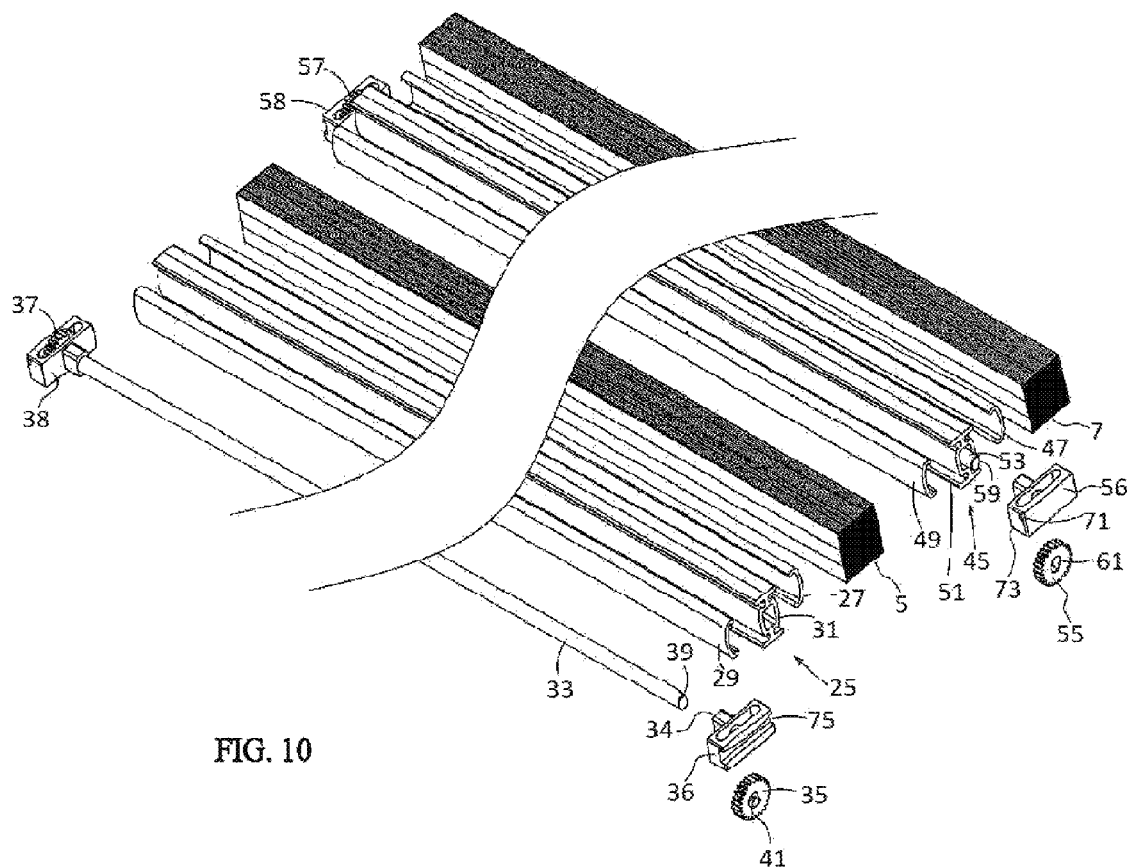
FIG. 10 is an exploded view of the two window shades and certain components of the drive mechanism.

Shades 5 and 7 and some associated drive mechanism components are shown in FIGS. 8 and 10. The shades are shown in their fully compressed form. At the bottom of shade 5 is a rail 25 which is comprised of a top cap 27, a bottom cap 29, and a channel 31. Caps 27 and 29 are configured so that they can be snap-fit onto channel 31 to secure them in place. Cap 27 is slipped through the bottom pleat of shade 5, and then snap-fit onto channel 31. This way the pleat is attached to rail 25. Thus, as rail 25 is moved, its movement produces extension or compression of shade 5. Cap 29 is decorative and is used to finish off the appearance of the window shade rail aesthetically.

An axle, or shaft, 33 is configured to be inserted into the through-hole in channel 31. As best shown in FIG. 3, the ends of axle 33 protrude from channel 31 so that they can carry gears 35 and 37. Gear 35, while positioned inside carrier 36, slides onto the end of axle 33 that has flat 39 on it. As the end of axle 33 passes through opening 34 in boss 34a (see FIGS. 3, 5, 7 and 10) of carrier 36 to reach gear 35, carrier 36 is simultaneously mounted onto axle 33 along with gear 35. Gear 35 has a corresponding flat 41 so that it is locked to rotate together with the axle. Similarly, gear 37, while positioned inside carrier 38, is lockably mounted onto the other end of axle 33 so as to be rotatable therewith. For reasons that will become apparent below, gear 37 is a driven gear, and gear 35 is a passive gear. As gear 37 is driven, its movement will cooperate with rack 43 in shell 17 (described in detail below with respect to FIGS. 6 and 7) to move rail 25 up and down to compress and expand shade 5. Since passive gear 35 is coupled to driven gear 37 by axle 33, the two gears will turn together to produce smooth motion of rail 25 along the window without any twisting of the rail or binding of the gears on the rack that might otherwise occur.

A similar arrangement is provided for shade 7. In particular, rail 45 is comprised of a top cap 47, a bottom cap 49, and channel 51. Caps 47 and 49 are configured so that they can be snap-fit onto channel 51 to secure them in place. Cap 47 is slipped through the bottom pleat of shade 7, and then it is snap-fit onto housing 51. This way the pleat is attached to rail 45. Thus, as rail 45 is moved, its movement produces extension or compression of shade 7. Cap 49 is slipped through the top pleat of shade 5, and then it is snap-fit onto channel 51 such that shade 5 is suspended between rails 25 and 45.

Axle 53 is configured to be inserted into the through-hole in channel 51. The ends of axle 53 protrude from channel so that they can carry gears 55 and 57. Gear 55, while positioned inside carrier 56, slides onto the end of axle 53 that has flat 59 on it. Gear 55 has a corresponding flat 61 so that both are locked to rotate together. Similarly, gear 57, while positioned inside carrier 58, is lockably mounted onto the other end of axle 53 so as to be rotatable therewith. For reasons that will become apparent below, gear 55 is a driven gear, and gear 57 is a passive gear. As gear 55 is driven, its movement will cooperate with rack 43 in shell 17 to move rail 45 up and down to compress and expand shades 5 and 7. Since passive gear 57 is coupled to driven gear 55 by axle 53, the two gears will turn together to produce the same smooth motion of rail 45 achieved for rail 25.

FIG. 3 clearly shows cable 63 accommodated within channel 75 of carrier 36. Cable 63 continues down from carrier 36 to tensioning assembly 67 (see FIG. 5) and then loops back up on the other side of retainer 77 to pulley 65. Retainer 77 is at the sides of shell 17 (see FIG. 4), as described in further detail below. The juxtaposition of cable 63 and retainer 77 is best seen in FIG. 3 which shows cable 63 sitting in the recess formed by retainer 77 and cap 160 (see FIG. 4). Of course, a similar arrangement is shown on the other side of the shade for cable 63a, retainer 77a and cap 160a.

Axles 33 and 53 are made of pultruded carbon fiber. Caps 27, 29, 47 and 49 are made of plastic, and they can all be identical to each other.

Figure 5:
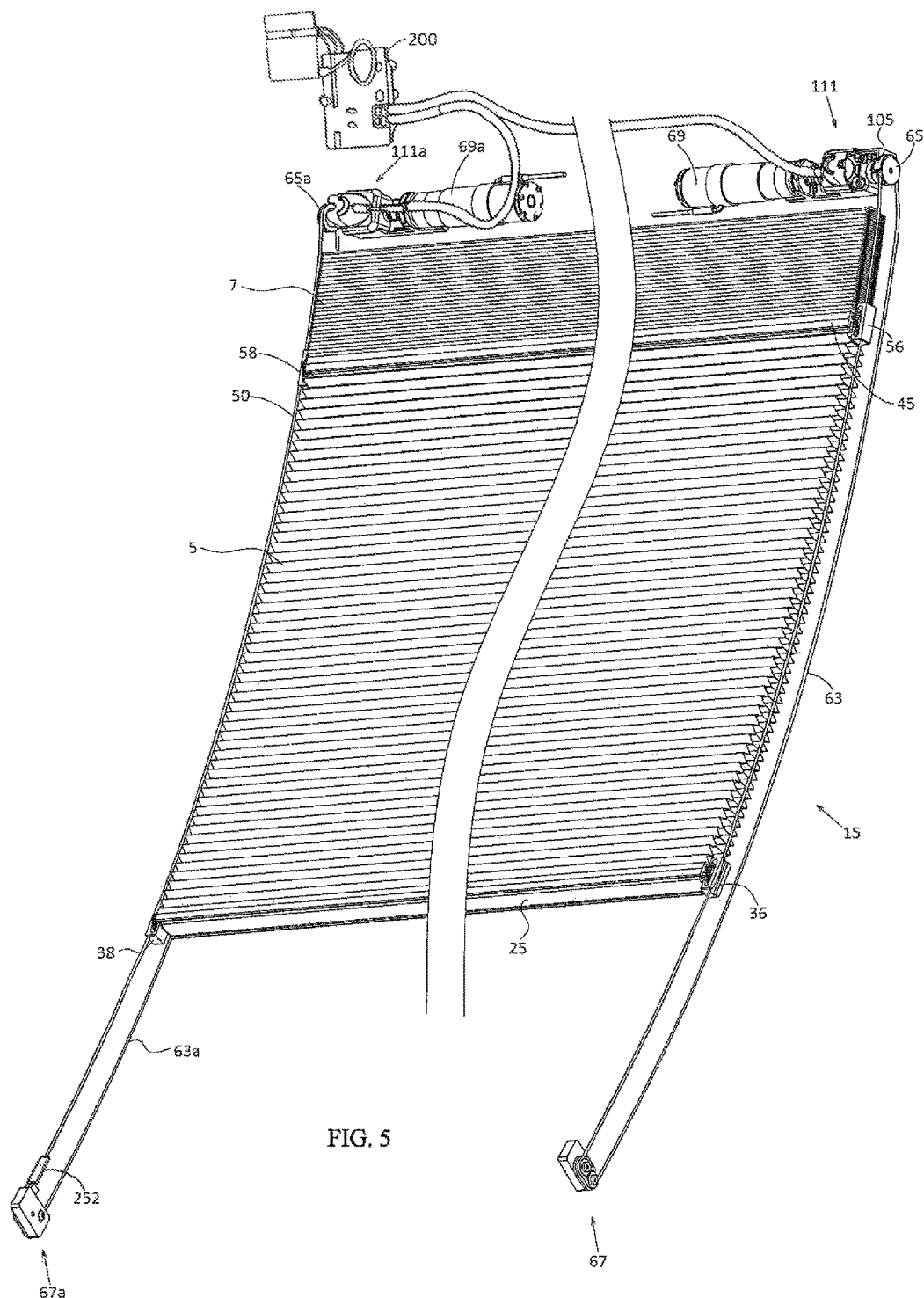
FIG. 5 is a perspective view of the motorized drive mechanisms for two window shades of the embodiment shown in FIG. 1.

Turning now to FIG. 5, a motorized drive mechanism 15 along with shades 5 and 7 are shown. Rail 25 is shown along with carriers 36 and 38 mounted to the ends of axle 33 (not shown ion FIG. 5) housed within rail 25. Similarly, rail 45 is shown with carriers 56 and 58 mounted to the ends of axle 53 (not shown in FIG. 5) housed within rail 45. Passing through carriers 36 and 56 is a loop of a Synchromesh cable 63 that cooperates with motor driven pulley 65 as part of a synchromesh cable drive. Such a drive is available from Stock Drive Products (www.sdp-si.com). Synchromesh cable 63 has a straight center section made of a core bundle of braided stainless steel wires encased in a nylon jacket. Wound spirally around the nylon jacket is another section made of a core bundle of braided stainless steel wires encased in a polyurethane jacket. When the synchromesh cable is placed on the pulley 65, the spirally wound cable section fits within and engages specially sized and configured helical grooves in the pulley, so that rotation of the pulley produces linear motion of the cable.

Cable 63 is stretched between the motor driven pulley 65 and cable tensioning assembly 67 (discussed in detail below with respect to FIGS. 11 and 12). A cable guard 105 (described below in detail in connection with FIGS. 13-15) is mounted adjoining cable 63 and pulley 65. Motor 69 turns pulley 65. Since cable 63 is meshed with the grooves in pulley 65, rotation of pulley 65 produces corresponding linear motion of cable 63.

Carrier 56 is a driven carrier because it is fixed to and driven by cable 63. As shown in FIG. 10, carrier 56 has a hole 71 in its end wall 73. (A good view of hole 71 is shown in FIG. 3 with respect to driven carrier 38). This hole 71 goes completely through carrier 56 to a similar opening (not shown) in the opposite end wall. Cable 63 is inserted through one of these openings and exits through the other one to pass completely through carrier 56. Cable 63 is affixed to carrier by a set screw (not shown) inserted into tapped hole 74 (see carrier 38 in FIG. 3). Cable 63 then continues to carrier 36 which is a passive carrier because it is not affixed to cable 63. Instead, carrier 36 has an elongated channel 75 passing completely therethrough from one end to the other. Cable 63 runs freely through channel 75. Channel 75 can be curved, as is visible in FIG. 10, for example, to match the arc followed by cable 63.

In operation, motor 69 is used to extend and compress shade 7. As motor 69 is controlled to turn in a particular direction, depending on whether extension or compression of shade 7 is desired, and for a specific number of turns, depending on how much movement of shade 7 is desired, it drives pulley 65. In turn, rotation of pulley 65 generates linear motion of cable 63. Since carrier 56 is attached to cable 63, they both move together. As carrier 56 moves, and because its associated gear 55 is in mesh with rack 43, the gear 55 will turn along with axle 53. Rotation of axle 53 will cause rotation of gear 57 at the opposite end of the axle. Since gear 57 is in mesh with rack 43, both ends of rail 45 will move synchronously and smoothly to position the shade as desired. Thus, due to the cable 63 being fixed to driven carrier 56 but not to passive carrier 36, motor 69 drives only shade 7 and not shade 5.

Similarly, at the other side of the window shade assembly, cable 63a is stretched between the motor driven pulley 65a and cable tensioning assembly. Motor 69a turns pulley 65a. Since cable 63a is meshed with the grooves in pulley 65a, rotation of pulley 65a produces corresponding linear motion of cable 63a. Cable 63a is affixed to driven carrier 38. Cable 63a then continues to passive carrier 58 which has the same structure as passive carrier 36. Passive carrier 58 is not affixed to cable 63a. Cable 63a runs freely through carrier 58.

In operation, motor 69a is used to extend and compress shade 5. As motor 69a is controlled to turn in a particular direction, depending on whether extension or compression of shade 5 is desired, and for a specific number of turns, depending on how much movement of shade 5 is desired, it drives pulley 65a. In turn, rotation of pulley 65a generates linear motion of cable 63a. Since carrier 38 is attached to cable 63a, they both move together. As carrier 38 moves, and because its associated gear 37 is in mesh with rack 43, the gear 37 will turn along with axle 33. Rotation of axle 33 will cause rotation of gear 35 at the opposite end of the axle. Since gear 35 is in mesh with rack 43, both ends of rail 25 will move synchronously and smoothly to position the shade as desired. Thus, due to the cable 63a being fixed to driven carrier 38 but not to passive carrier 58, motor 69a drives only shade 5 and not shade 7.

Motors 69 and 69a receive power from a power source (not shown) in the aircraft transitioning into the window assembly through connector 101 mounted in shell 17. Wires 99 transition from connector body 101 to electronic control circuit 103 in the form of a printed circuit board mounted on shell 17.

Figure 6:
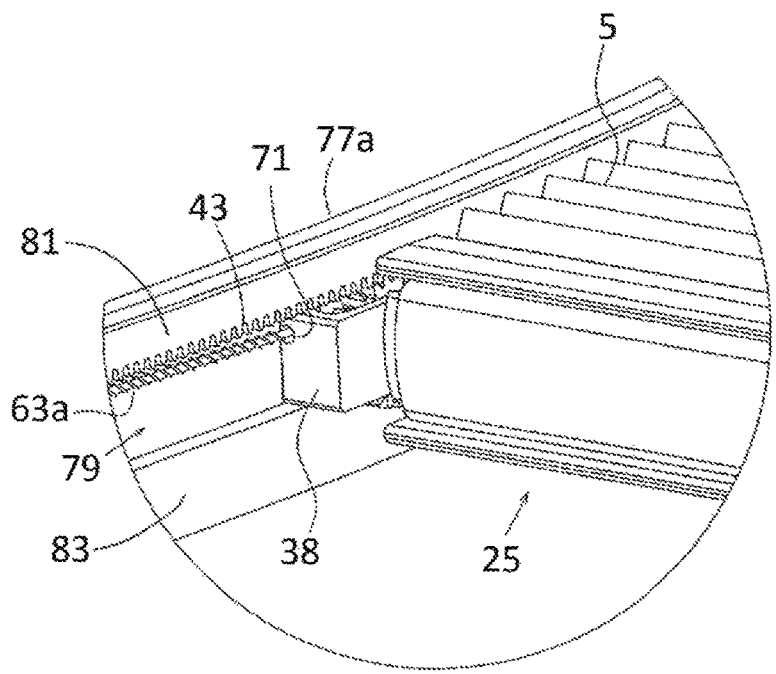
FIG. 6 is an enlarged, perspective view of the rail and drive mechanism in the vicinity of the cross-section shown in FIG. 7.
Figure 7:
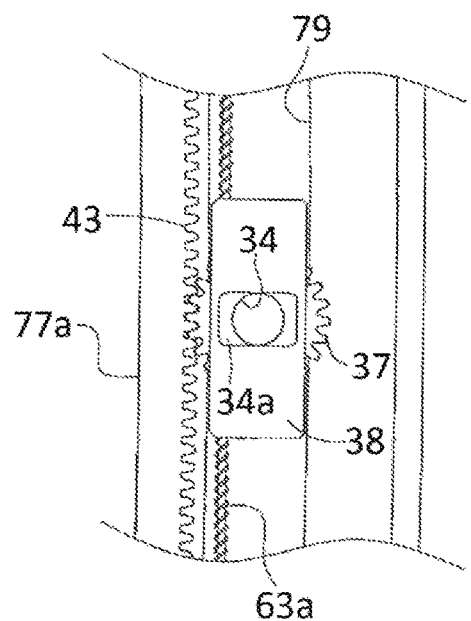
FIG. 7 is a cross section taken along line 7-7 of the embodiment shown in FIG. 1.

The motorized drive mechanism 15 is secured within window assembly 1 by retainers 77 and 77a (which are mirror images of each other) at the side edges of shell 17, as shown in FIG. 4. FIGS. 6 and 7 illustrate the retainers in greater detail. Retainer 77a has a slot 79 notched into its side. Slot 79 is defined by front wall 81 and rear wall 83. Rack 43 is embedded into the front wall 81 to face slot 79. Carrier 38 rides within slot 79 and gear 37 meshes with rack 43. Cable 63a is also visible in these drawings, as is boss 34a with its opening 34 to receive axle 33.

Figure 11:
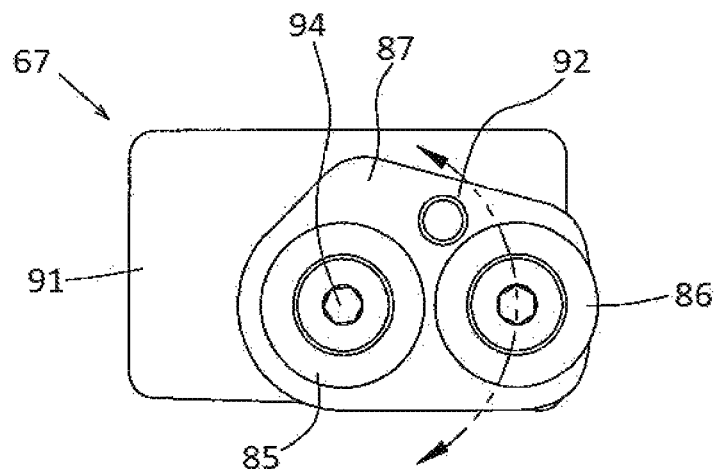
FIG. 11 is a front view of a cable tensioning assembly.
Figure 12:
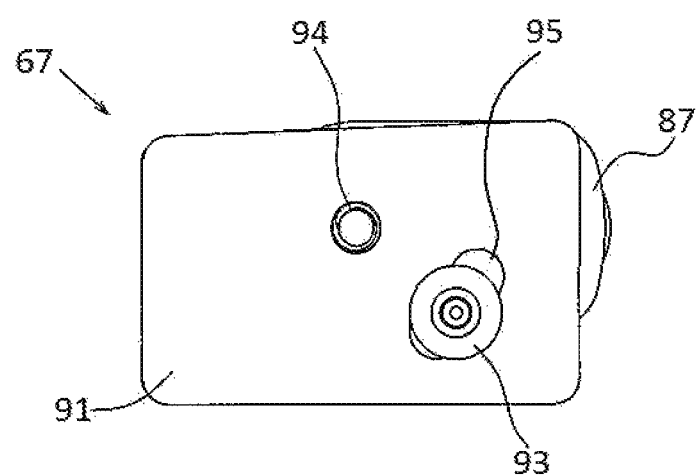
FIG. 12 is a back view of the cable tensioning assembly shown in FIG. 11

FIGS. 11 and 12 show that cable tensioning assembly 67 includes pulleys 85 and 86 rotatably mounted on plate 87 which is pivotably mounted on pillow block 91. The pivot point 94 permits rotation of plate 87 relative to pillow block 91. A set point adjusting screw 93 is inserted into a threaded opening 92 in plate 87. Screw 93 can slide within slot 95 in block 91 if it is not tightened. Its position within the slot can be fixed by tightening the screw. In operation, cable 63 is looped around pulleys 65, 85 and 86. As plate 87 is pivoted around pivot point 94, the tension on cable 63 can be adjusted. When the desired tension is reached, screw 93 is tightened to keep plate 89 in that position.

Figure 13:
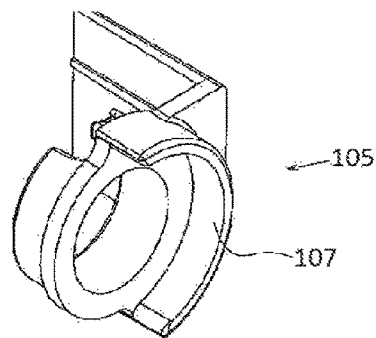
FIG. 13 is a perspective view of a cable guard.
Figure 14:
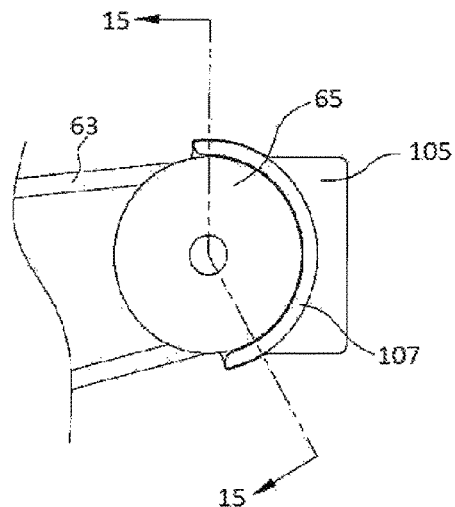
FIG. 14 is a side view of the cable guard shown in FIG. 13.
Figure 15:
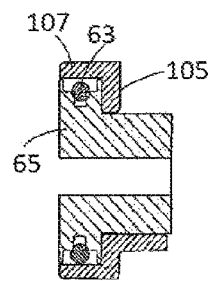
FIG. 15 is a cross section taken along line 15-15 of FIG. 14.

FIGS. 13-15 show details of cable guard 105. It has a curved surface 107 that is concentric with the pulley 65. Pulley 65 sits within the curvature of surface 107. The slight clearance between them is sized so that, as is apparent from FIGS. 14 and 15, cable 63 is trapped between pulley 65 and surface 107. This prevents cable 63 from jumping off pulley 65 as the motor 69 applies various forces to the cable. There are left and right versions of cable guard 105 which are mirror images of each other.

Figure 16:
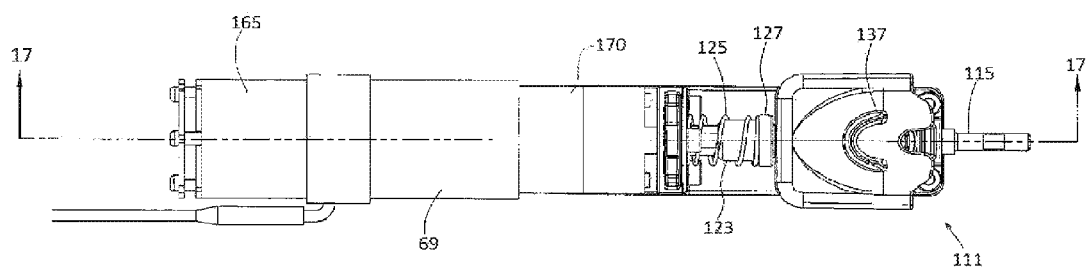
FIG. 16 is a plan view of the motor and manual override assembly.
Figure 17:
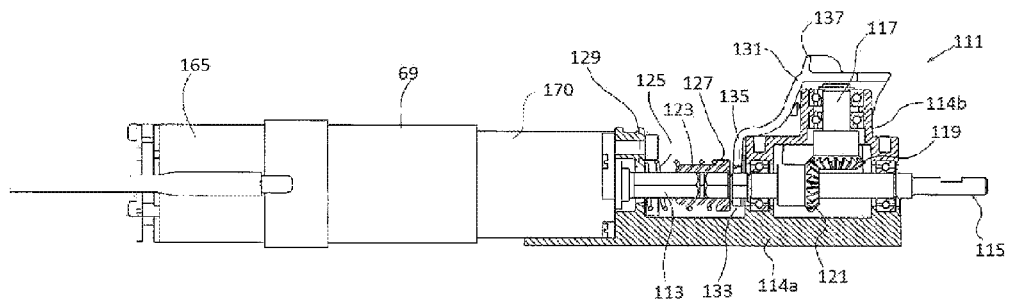
FIG. 17 is a cross section taken along line 17-17 of FIG. 16.

Window assembly 1 also includes a manual override assembly 111 shown in FIGS. 16 and 17. This feature is provided so that the window shades can be operated even under conditions when electrical power is lost. Motor 69 has a hex-shaped drive shaft 113. Drive shaft 113 is mounted in the housing comprised of lower housing 114a and upper housing 114b. Drive shaft 113 turns output shaft 115 via manual override assembly 111. Output shaft 115 has its pulley driving end drivingly coupled to pulley 65. The other end of output shaft 115 is also hex-shaped. Coupler 123 is slidably mounted on the hex-shaped ends of shafts 113 and 115 which adjoin each other. Spring 125 is under compression between shoulder 127 on the coupler and shoulder 129 on the bottom housing. Thus, spring 125 biases coupler 123 into its coupling position. In this position of coupler 123, rotation of motor drive shaft 113 will be transmitted to pulley 65 via shaft 115.

Figure 18:
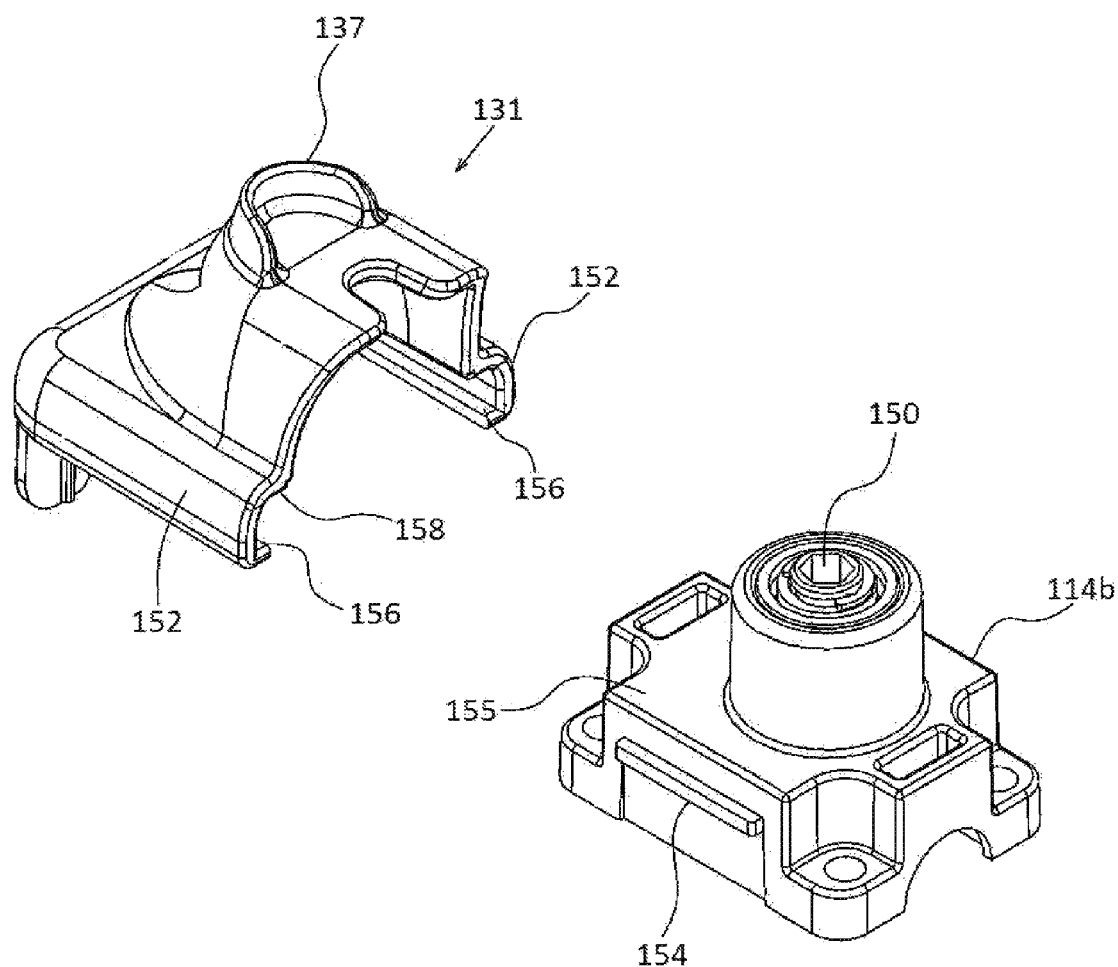
FIG. 18 is an exploded perspective view of a portion of FIG. 17.

The manual override assembly 111 includes a vertical shaft 117 with a bevel gear 119 at its end which is in mesh with bevel gear 121 on output shaft 115. The top of shaft 117 has an opening 150 (see FIG. 18) that is shaped to receive a tool (not shown) that can be inserted and then used to manually turn shaft 117. As shaft 117 and, along with it, bevel gear 119 are turned, bevel gear 121 can turn shaft 115. However, as long as shafts 113 and 115 are coupled to each other, manual rotation of shaft 115 is prevented by motor 69. To avoid this hindrance, a slidable cover 131 is provided. The flared sides 152 of cover 131 slide on rails 154 and the upper surface 155 of upper housing 114b. As can be appreciated from FIG. 18, the straight bottom edge 156 of flared side 152 engages under rail 154, while the top 158 rides on surface 155.

Cover 131 has a bottom skirt 133 that has a half-opening 135 through which shaft 115 passes. The wall of skirt 133 that defines opening 135 bears against coupler 123. As shown in FIGS. 16 and 17, cover 131 is in its static, rest position as spring 125 presses coupler to the right, and coupler 123 likewise presses the skirt to the right. Cover 131 has an upwardly extending wall 137 that can serve as a finger catch. Cover 131 can be moved manually to the left by hooking a finger against wall 137 and pushing against the force exerted by spring 125. This uncovers opening 150 in shaft 117 so that the turning tool can be inserted into it. With the tool in the opening, the cover 131 is prevented from returning to its rest position under the influence of spring 125. Thus, cover 131 stays in its displaced position until the turning tool is removed.

As cover 131 is moved to its displaced position, skirt 133 forces coupler 123 to slide off output shaft 115, thereby de-coupling shafts 113 and 115 from each other. This frees output shaft 115 to turn under turning forces applied by shaft 117 and gears 119, 121 without interference from motor 69.

In order to prevent uncommanded motion of the shades, motors 69 and 69a are each provided with an electromagnetic brake 165 that is activated by the electronic control when the shade reaches its desired position. The motors are also provided with gearhead 170. Motors 69 and 69a are available from Faulhaber as Part No. 2232V0085. The electromagnetic brake 165 is available from Inertia Dynamics LLC as Part No. M1701-0005. The gearhead is available from Faulhaber as Part No. 104250.

Although the motorized drive mechanism 15 is disclosed as being motor actuated, the rest of mechanism 15 without the motors can also be highly useful. Motors 69 and 69a can be replaced by a manual drive arrangement. It could be similar to the manual override assembly 111 as disclosed herein that would function as a permanent drive rather than as an override. However, other manually driven arrangements could also be applied to turn pulley 65 and move cable 63 so as to create linear motion for extending and compressing the shades.

Figure 19:
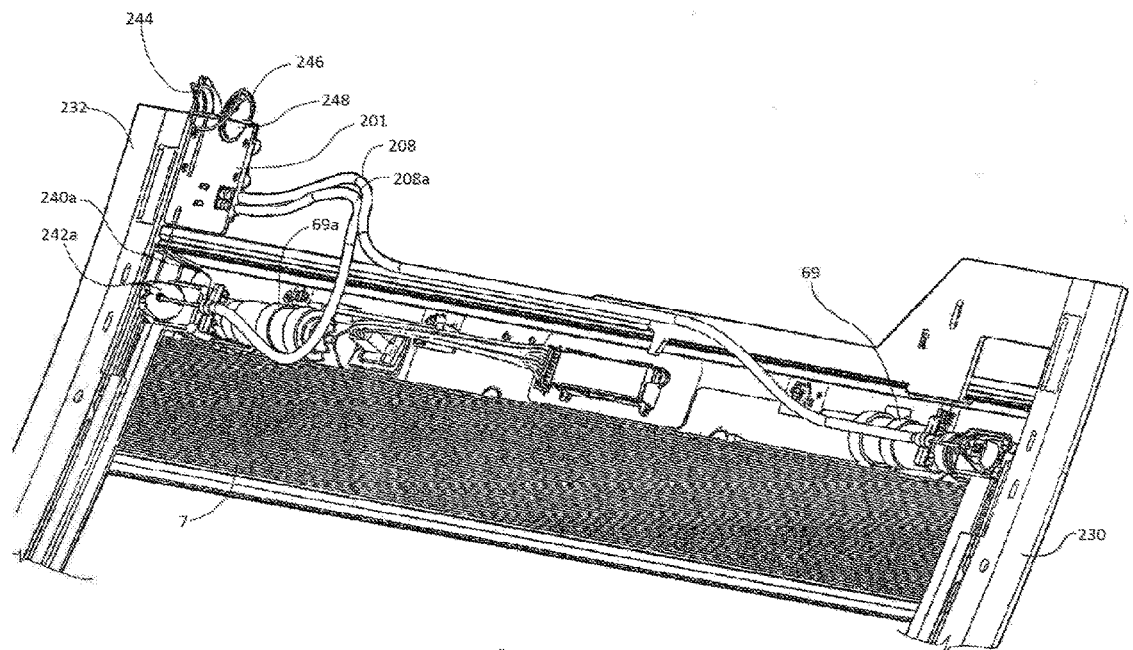
FIG. 19 is a front view of a window shade assembly incorporating the emergency override release mechanism.
Figure 20:
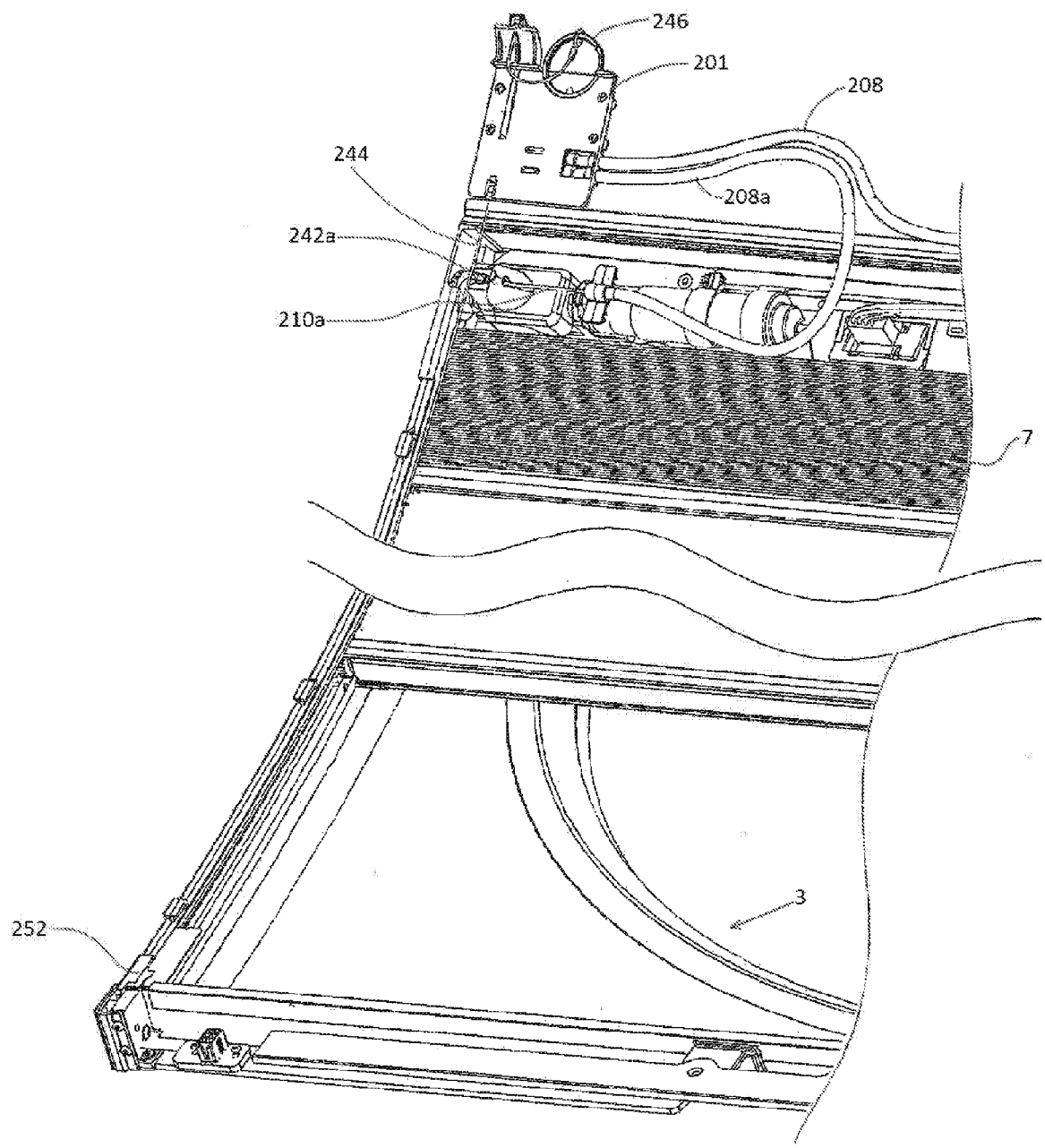
FIG. 20 is a front view of the left side of the window shade assembly of FIG. 19 shown positioned over a cutout or hole, with a left-side frame member removed for simplicity.
Figure 21:
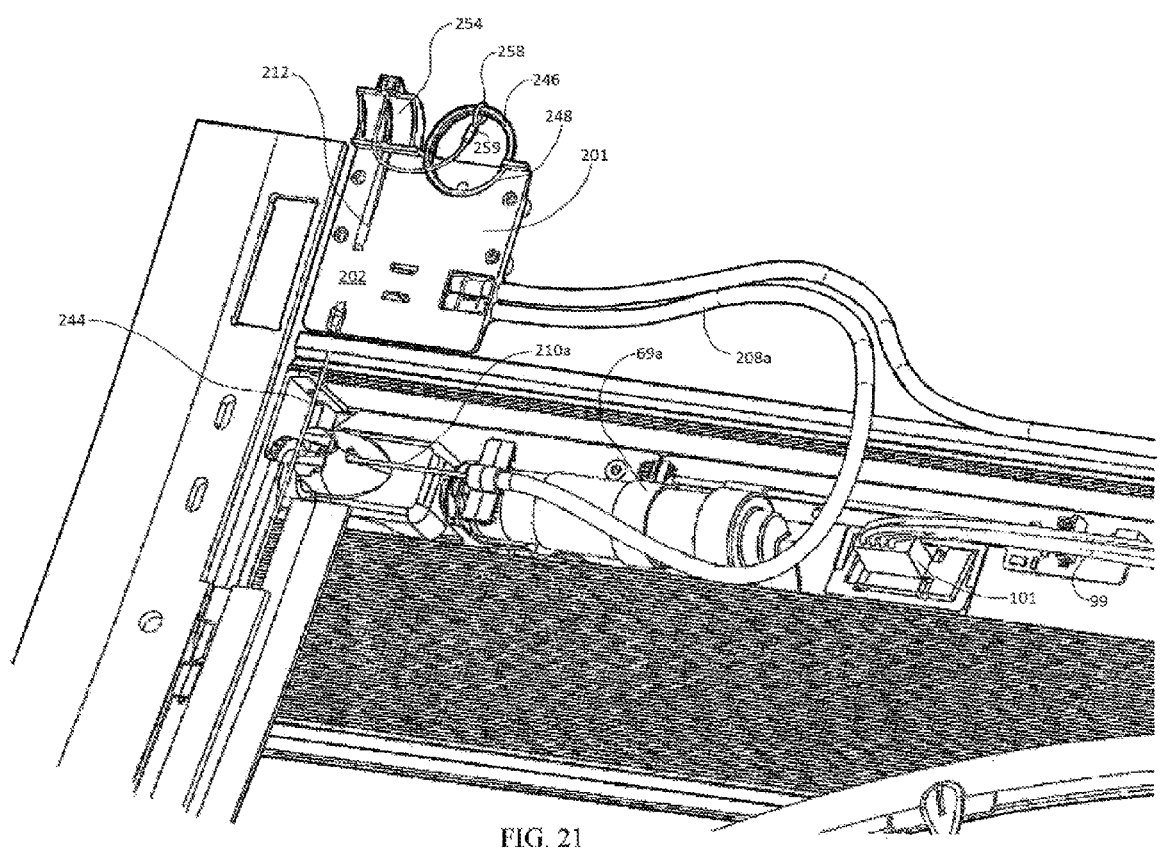
FIG. 21 is a close-up front view of the window shade assembly of FIG. 19.

The manual override assembly 111 discussed above and depicted in FIGS. 16 and 17 requires use of a tool to activate the release mechanism. Such a requirement does not easily provide for passenger activation of the release mechanism to raise the shade material to its open position. With reference to FIGS. 19 through 21, a shade assembly having an emergency override release ("EOR") mechanism 200 which is readily usable by a passenger is shown. The EOR mechanism includes a mounting plate 201 which is affixed to a left frame member 232. It will be appreciated that the mounting plate can, alternatively, be affixed to a right frame member 234 and that either option is a matter of design choice. The mounting plate 201 includes features such as guides and seats, as explained below, and is preferably formed of a plastic material through injection molding. The mounting plate 201 has a first surface or passenger side 202, i.e., a side facing a passenger who will use the EOR mechanism, and a second, opposite side 204, which is positioned facing an airplane panel.

A pair of motor release cables 210, 210a—one for each motor 69, 69a, respectively—is provided for disengaging the motor from the pulleys 65 and allowing for manual lifting of the shade material 5, 7. Because both shades are attached to each other in the manner described above, the EOR will raise whichever shade is extended at the time of EOR operation. For simplicity, the EOR is described as operating on shade 5. Each motor release cable is telescopically positioned in a release cable sheath 208, 208a. As shown in FIGS. 19-21, a first end of each sheath is affixed to a cable seat 206, 206a, and a second end is affixed to a motor release cable seat 240, 240a positioned by each respective motor assembly 69, 69a. Each motor release cable 210, 210a is disposed in its respective sheath 208, 208a and is anchored at a first end to a mounting plate 201, and at a second end to a cable anchor 242, 242a at each motor assembly. A purpose of the cable sheaths is to provide a cover for, and smooth and sliding movement of, the cables disposed therein. As will be explained below, applying tension to the cables 210, 210a causes decoupling of the motors and allows for manual operation of the shades.

Figure 23:
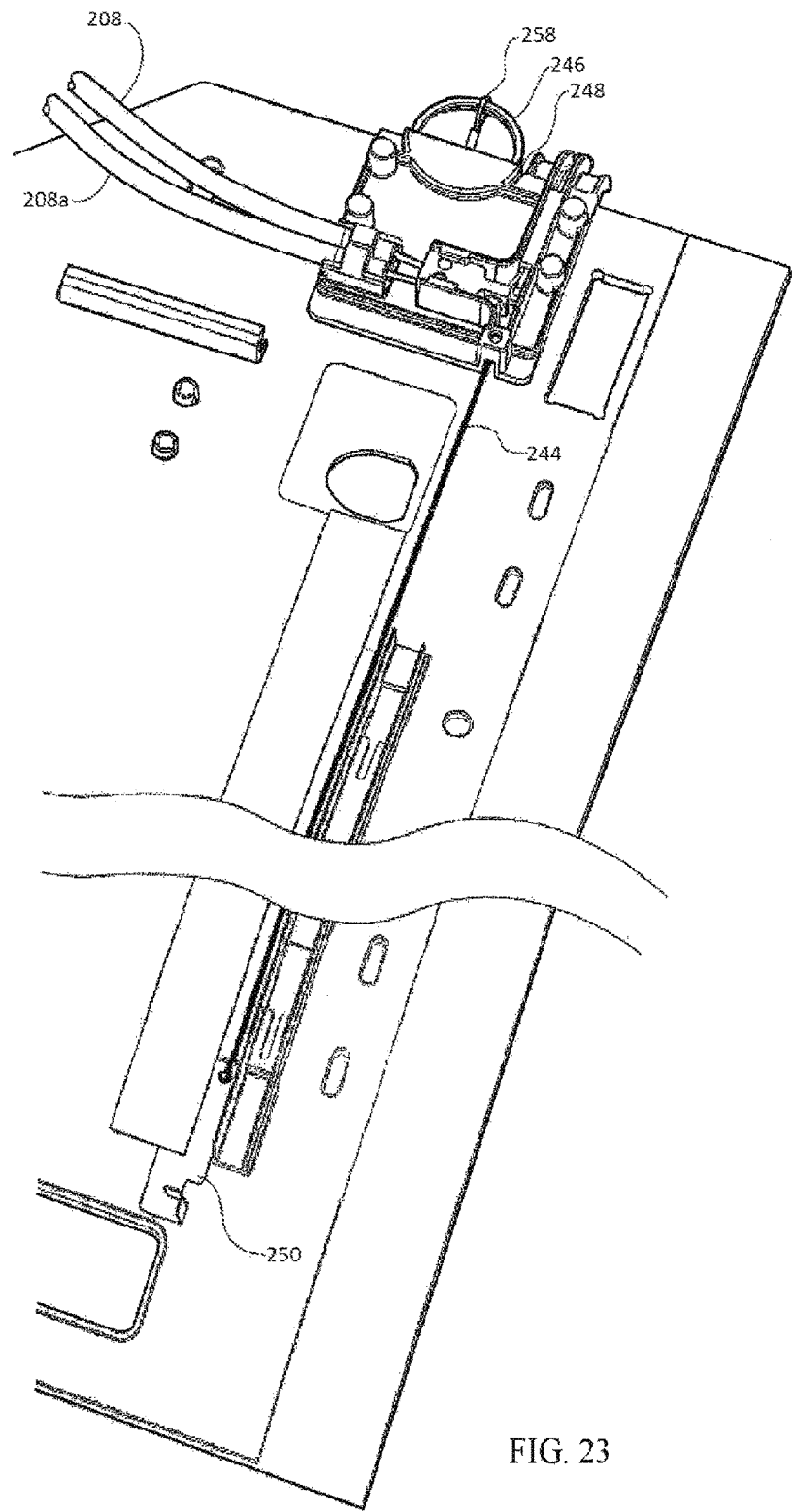
FIG. 23 is a back view of the left side of the window shade assembly of FIG. 19.
Figure 24:
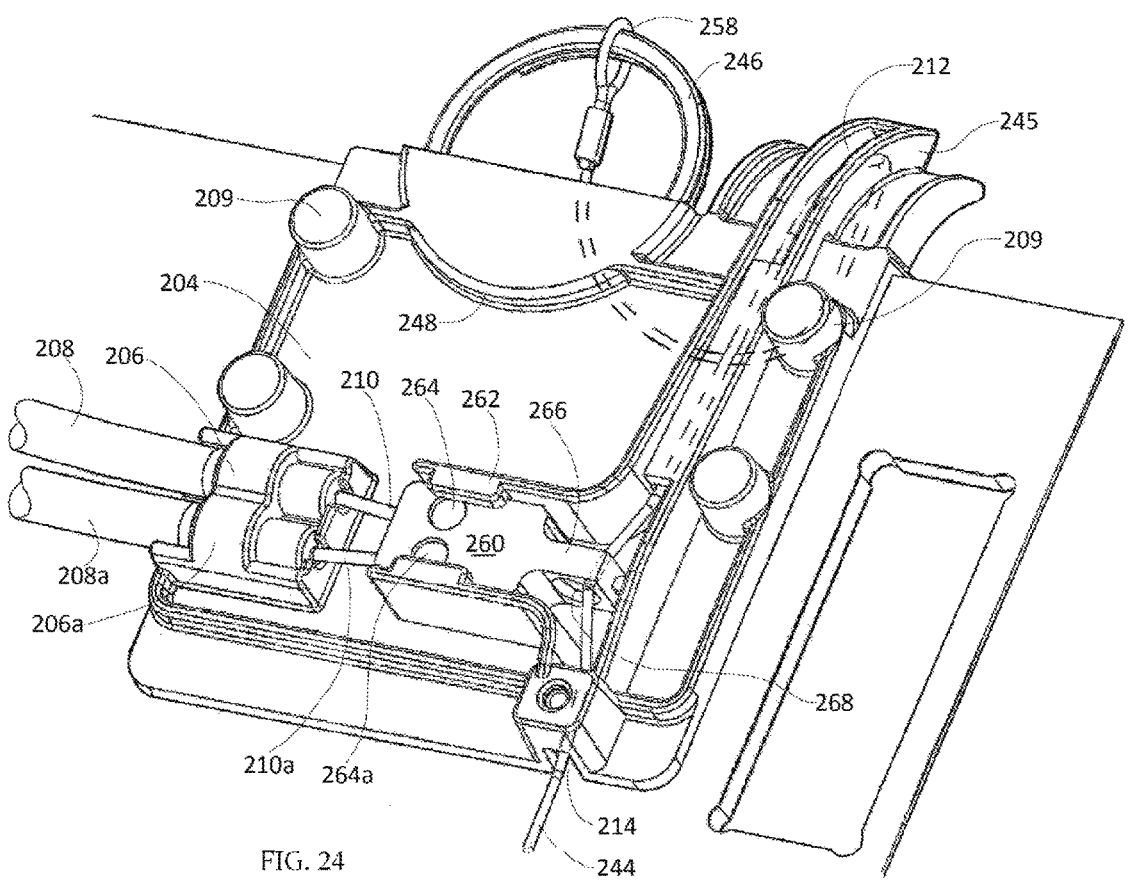
FIG. 24 is a close-up back view of the emergency override release mechanism.

Referring to FIGS. 23-24, the second side 204 of mounting plate 201 includes the cable seats 206, 206a. An actuator member 260 is positioned in slideable arrangement with the mounting plate by confining the member 260 to an anchor 262 configured as overhang edges affixed to the second side 204. An actuator member 260 is configured as a block portion having at one end (the left side with reference to FIG. 24), a pair of anchor regions 264, 264a at which an end of each cable 210, 210a is affixed. In a preferred embodiment, each anchor region is configured as a through-hole for receiving a post or screw (not shown) about which each cable end is secured. The opposite side of the actuator member 260, is configured as an actuating arm 266 having a through-hole 268 through which a tether, preferably in the form of a pull cord 244, extends. The mounting plate 201 further includes a plurality of posts 209 for receiving fastening screws (not shown) to secure the plate to a shade assembly panel.

Figure 22:
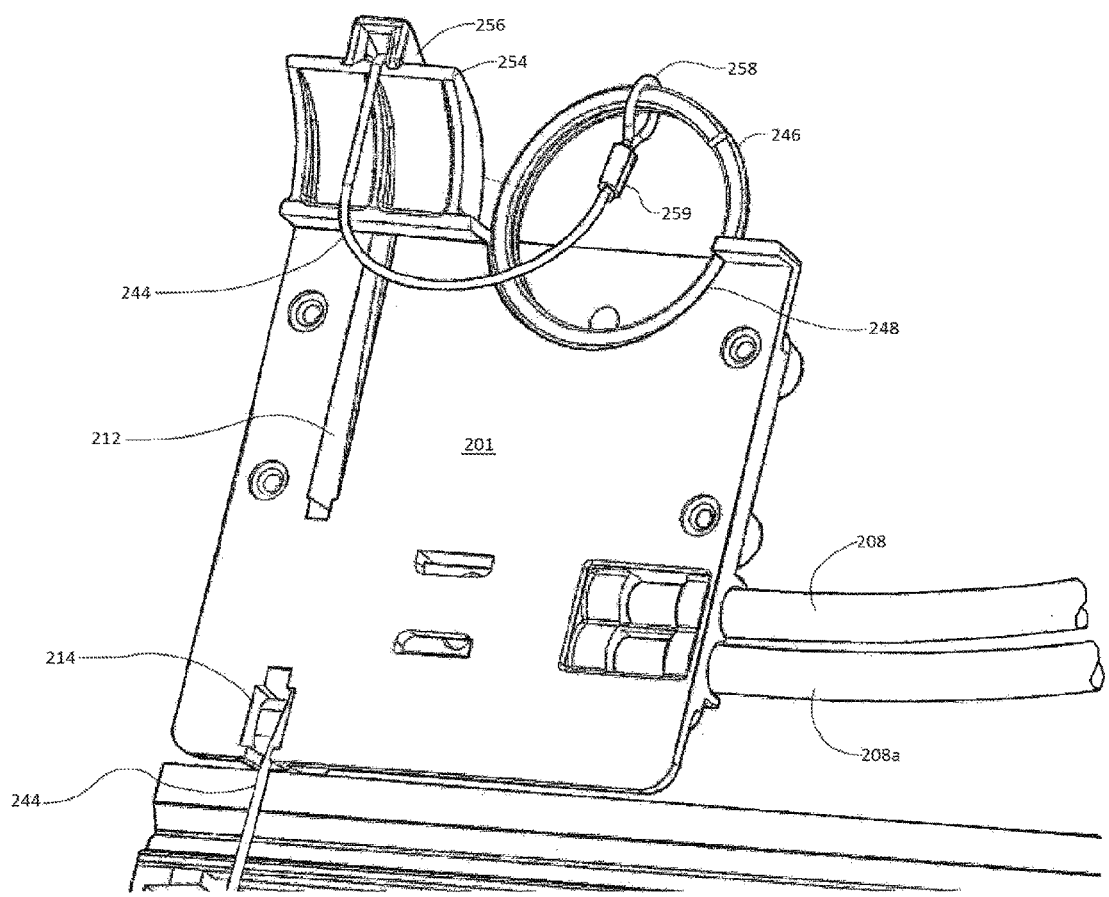
FIG. 22 is a close-up front view of the emergency override release mechanism.

With reference to FIGS. 22 and 24, the mounting plate further includes a guide channel 212 and a feed channel 214 for accommodating an end of the pull cord 244. As shown, one end of the pull cord is fed through the feed channel 214 and along the guide channel 212 where the pull cord extends along a guide ramp 254 and through the guide door 256. The end of the pull cord is formed as a loop 258 which is attached to a pull ring 246 as shown. A clamp 259 is provided to secure the pull cord loop 258 to the pull ring 246. Also as shown, a ring seat 248 is molded in mounting plate 201 and is dimensioned, relative to the pull ring, to provide a snap-fit therebetween. The pull ring 246 is positioned to provide passenger access thereto in order to employ the EOR mechanism.

Figure 25:
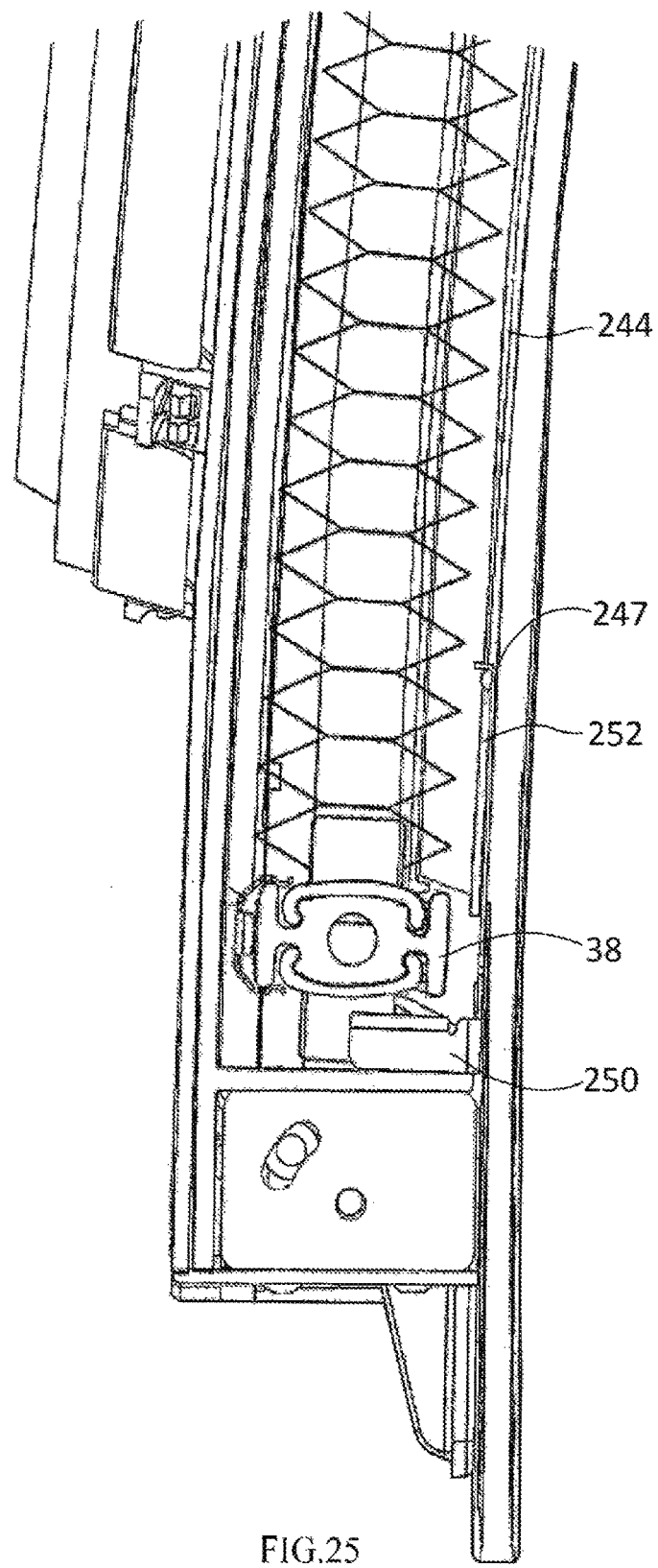
FIG. 25 is a left side close-up view of the window shade assembly of FIG. 8, but with a release cord connected to a shade clip with the shade in a fully deployed position.
Figure 26:
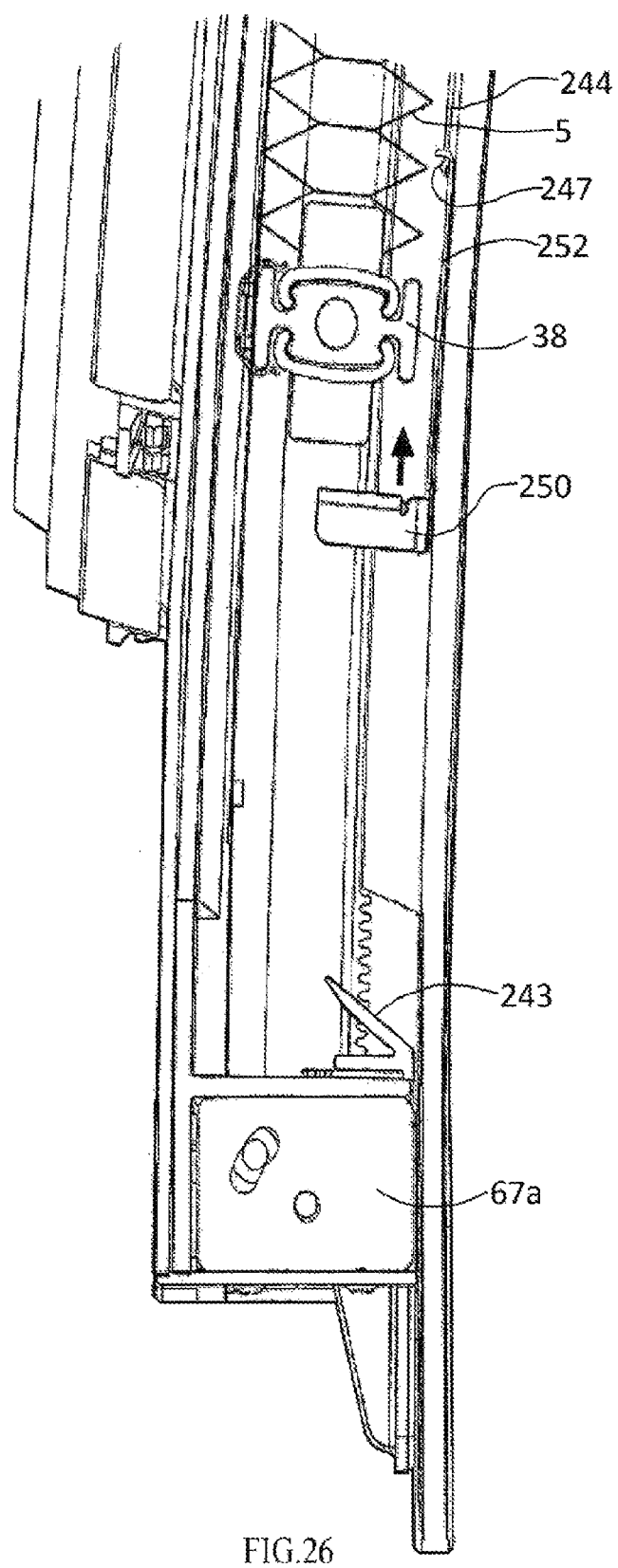
FIG. 26 is a left side close-up view of the window shade assembly of FIG. 25 with the shade fabric shown in a partially open position.

With reference to FIGS. 23 and 25-26, the remaining portion of the pull cord extends along and behind an edge of the shade 5 and terminates at a shade clip 250 and, in particular, at a clip extension 252 connected to the shade clip 250. The end 247 of the cord may be secured to the clip extension 252 in any manner, such as by feeding the end through a hole in an angled portion of the clip extension and forming a knot, or by an adhesive. The clip and clip extension may be formed as a single component part, or as separate parts connected together in any known manner. Moreover, those parts may be formed of plastic, or of a metal, such as aluminum.

It is noted that tensioning assembly 67a as shown in FIG. 26 includes a seal 243 which is compressible by shade clip 250 when the shades are closed. The seal is made of an opaque material, preferably rubber, which extends along the edge of the shade cassette housing to prevent light from entering a narrow space that would otherwise exist between the bottom edge of the shade and the bottom edge of the housing when the shade is closed.

Figure 27A:
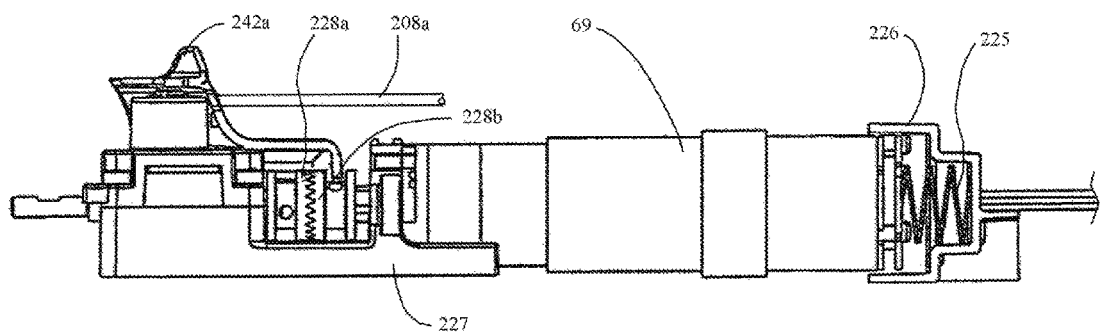
FIG. 27A is a detailed view of a spring-mounted motor seat coupled to a motor release cable and engaged with shade control gearing.
Figure 27B:
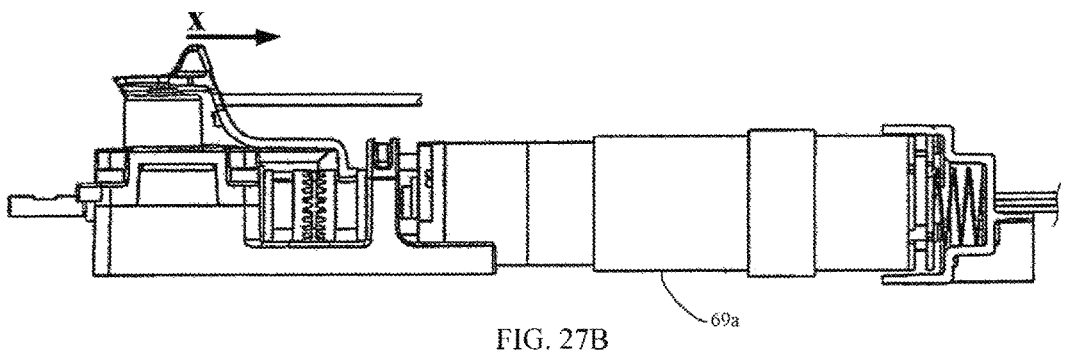
FIG. 27B is a detailed view of a spring-mounted motor seat coupled to a motor release cable and disengaged from shade control gearing.

With reference to FIGS. 27A and 27B, an alternative motor and mounting arrangement to what is depicted in FIGS. 16 and 17 is shown. In FIGS. 27A and 27B the motor 69a seats between a spring seat 226 and a motor mount 227. An output shaft of the motor is connected to a crown gear 228b which mates with a crown gear 228a which, in turn, is connected to the shade assembly for allowing raising and lowering of the shades under motor power during normal operation. The motor is biased by compression spring 225 to ensure engagement between crown gears 228a and 228b. Also as shown, motor release cable sheath 208a containing cable 210a is connected to cable anchor 242a. When the cable 210a is in its rest state, the motor is positioned as shown in FIG. 27A such that the crown gears 228a and 228b are engaged with each other. However, when cable 210a is moved in a direction indicated by arrow "X" in FIG. 27B, the cable anchor causes motor 69a to compress spring 225 and unseat the crown gears from each other. This decouples the motor from the shade assembly and allows the shades to be manually raised in a manner described below.

When the EOR mechanism is not in use and is in its initial rest position with the pull ring 246 in its ring seat 248 as shown in FIG. 24, the spring clip and extension are disposed at a bottom of the shade track (see FIG. 23). It is pointed out that the initial position of the spring clip is independent of any vertical position of the shade 5.

A description of the operation of the EOR mechanism will now be provided. In the event of a power interruption such that normal shade operation is unavailable and movement of the shade 5 by a passenger to an open position is required or desired, a user will simply remove the pull ring 246 from the ring seat 248 and pull the ring in a downward direction. Such motion will apply tension to the pull cord and, thereby, cause movement of the actuator member 260 in a direction to the right in FIG. 24. When the actuator member 260 is moved in this manner, tension is applied to the motor release cables 210, 210a which causes the motors to disengage from crown gears (e.g., crown gear 228a in FIG. 27A) and remain disengaged so long as sufficient tension remains on the pull cord. As the motors are decoupled, the continued tension on the pull cord will raise the shade clip which is seated below the carrier 38 to raise the carrier and, thereby, the shade 5 as shown in FIG. 26.

Upon release of the pull cord, the actuator member will return to its original position as shown in FIG. 24, and the motors will re-engage the crown gears (e.g., crown gear 228a) for normal operation. However, the shade clip will remain in its raised position, a length of the pull cord will be disposed outside of the window shade assembly, and the pull ring 246 will remain unseated from the ring seat 248. Once power is restored, the EOR mechanism can be re-set to its initial position by simply operating the "down" switch on the shade assembly whereby, as the shade carrier moves downward, the carrier will contact and move the shade clip to its initial position, whereupon the pull cord will be fed back into the channel. Thereafter, the pull ring can be re-inserted into the ring seat.

It should be pointed out that regardless of whether operating power is available for operation of the shade assembly, the EOR mechanism can be used to decouple the motors and allow for manual raising of the shade. The EOR can be reset by simply operating the "down" switch as explained above. It is intended, however, that the EOR mechanism will only be used during an operating power failure condition.

What is claimed is:

1. A manually operated override release mechanism for a motorized widow shade assembly having a motor, a pulley, and a shade fabric with a leading edge, the shade fabric having a first side disposed proximate to a user, and a second side, the shade fabric being disposed behind a pane, the pane being configured to prevent direct user access to the shade fabric, the shade fabric being coupled to the pulley and the motor so as to be movable between an opened position and a closed position by operation of the motor on the pulley coupled to the shade fabric, the override release mechanism comprising:

an actuator configured to selectively couple and de-couple the motor from the pulley, the actuator being movable between a first position in which the motor is coupled to the pulley and a second position in which the motor is de-coupled from the pulley, the actuator having a biasing mechanism that biases the actuator in the first position, the actuator having a first side secured to a first end of a cable, and a second side, the cable having a second end connected to the motor, wherein the actuator, by control of tension to the cable, is configured to move the motor between an operating position, in which the motor is coupled to the pulley of the motorized window shade assembly, and a decoupled position in which the motor is decoupled from the pulley of the motorized window shade assembly, the motor being in the operating position when the actuator is in the first position and being in the decoupled position when the actuator is in the second position; and a tether attached at one end to the shade fabric proximate the leading edge, the tether being slidably engaged with the actuator and having a free end accessible by the user, the tether being arranged with respect to the actuator such that applying tension to the free end of the tether urges the actuator to the second position and causes decoupling of the motor from the pulley of the motorized window shade assembly, the decoupling of the motor permitting manual operation of the shade fabric by the user through extension of the tether, and the tether and the actuator being arranged such that reducing tension to the free end of the tether causes re-coupling of the motor to the pulley of the motorized window shade assembly to allow for motorized operation of the shade fabric in the operating position of the motor.

2. The manually operated override release mechanism of claim 1, further comprising a mounting plate in which the actuator is slidably mounted to move between the first and second positions.

3. The manually operated override release mechanism of claim 2, wherein the mounting plate comprises an anchor for maintaining slidable engagement of the actuator with the mounting plate.

4. The manually operated override release mechanism of claim 1, wherein the second side of the actuator has a through-hole in which the tether extends.

5. The manually operated override release mechanism of claim 1, wherein the motor is biased in an engaged position by a spring and wherein decoupling of the motor occurs by compressing the spring during pulling of the free end of the tether.

6. The manually operated override release mechanism of claim 1, further comprising a pull ring connected to the free end of the tether and wherein the frame comprises a ring seat in which the pull ring is stored during non-use of the override release mechanism.

7. The manually operated override release mechanism of claim 6, wherein the tether comprises a pull cord.

8. The manually operated override release mechanism of claim 7, wherein a length of the pull cord extends from the window shade assembly upon a recoupling of the motor to the window shade assembly, and wherein the length of the pull cord is retracted into the window shade assembly by operation of the motor.

9. The manually operated override release mechanism of claim 1, wherein the motor comprises a pair of motors and the shade fabric comprises a pair of shade fabrics, each fabric being controlled by a respective one of the motors, wherein applying a pull force to the tether decouples both motors and raises both shade fabrics, and wherein reducing the pull force causes a re-coupling of the motors.

10. A manually operated override release mechanism for a motorized widow shade assembly having a motor, a pulley, and a shade fabric with a leading edge, the shade fabric having a first side disposed proximate to a user, and a second side, the shade fabric being disposed behind a pane, the pane being configured to prevent direct user access to the shade fabric, the shade fabric being coupled to the pulley and the motor so as to be movable between an opened position and a closed position by operation of the motor on the pulley coupled to the shade fabric, the override release mechanism comprising:

a mounting plate;

an actuator configured to selectively couple and de-couple the motor from the pulley, the actuator being slidably secured to the mounting plate to provide for movement of the actuator with respect to the mounting plate between a first position in which the motor is coupled to the pulley and a second position in which the motor is de-coupled from the pulley, the actuator having a biasing mechanism that biases the actuator in the first position, the actuator having a first side secured to a first end of a cable, and a second side having a through-hole formed therein, the cable having a second end connected to the motor, the cable applying tension to the actuator for biasing the actuator in the first position, the actuator, by control of tension to the cable, being configured to move the motor between an operating position, in which the motor is coupled to the pulley of the motorized window shade assembly, and a decoupled position in which the motor is decoupled from the pulley of the motorized window shade assembly, the motor being in the operating position when the actuator is in the first position and being in the decoupled position when the actuator is in the second position; and a tether extending through the through-hole of the actuator and attached at one end to the shade fabric proximate the leading edge, the tether being slidably engaged with the actuator and having a free end accessible by the user, the tether being arranged with respect to the actuator such that applying tension to the free end of the tether urges the actuator to the second position and causes decoupling of the motor from the pulley of the motorized window shade assembly, the decoupling of the motor permitting manual operation of the shade fabric by the user through extension of the tether, and the tether and the actuator being arranged such that reducing tension to the free end of the tether causes re-coupling of the motor to the pulley of the motorized window shade assembly to allow for motorized operation of the shade fabric in the operating position of the motor.

11. The manually operated override release mechanism of claim 10, wherein the mounting plate comprises an anchor for maintaining slidable engagement of the actuator with the mounting plate.

12. The manually operated override release mechanism of claim 10 wherein the motor is biased in an engaged position by a spring and wherein decoupling of the motor occurs by compressing the spring during pulling of the free end of the tether.

13. The manually operated override release mechanism of claim 10, further comprising a pull ring connected to the free end of the tether and wherein the mounting plate comprises a ring seat in which the pull ring is stored during non-use of the override release mechanism.

14. The manually operated override release mechanism of claim 13, wherein the tether comprises a pull cord, wherein a length of the pull cord extends from the window shade assembly upon a recoupling of the motor to the shade assembly, and wherein the length of the pull cord is retracted into the window shade assembly by operation of the motor.

15. The manually operated override release mechanism of claim 10, wherein the motor comprises a pair of motors and the shade fabric comprises a pair of shade fabrics, each fabric being controlled by a respective one of the motors, wherein applying a pull force to the tether decouples both motors and raises both shade fabrics, and wherein reducing the pull force causes a re-coupling of the motors.

* * * * *